United States Patent
Collins (10) Patent No.: US 8,985,460 B1
(45) Date of Patent: Mar. 24, 2015

(54) METHOD AND SYSTEM FOR DISTINGUISHING BARCODE SCANNER DATA ENTRY FROM OTHER FORMS OF DATA ENTRY

(71) Applicant: Intuit Inc., Mountain View, CA (US)

(72) Inventor: Roger S. Collins, Monte Rio, CA (US)

(73) Assignee: Intuit Inc., Mountian View, CA (US)

( * ) Notice: Subject to any disclaimer, the term of this patent is extended or adjusted under 35 U.S.C. 154(b) by 185 days.

(21) Appl. No.: 13/653,131

(22) Filed: Oct. 16, 2012

(51) Int. Cl.
*G06F 17/00* (2006.01)
*G06F 21/64* (2013.01)

(52) U.S. Cl.
CPC ........................ *G06F 21/64* (2013.01)
USPC ........................ 235/462.15; 235/375

(58) Field of Classification Search
USPC .................... 235/375, 379, 462.15
See application file for complete search history.

(56) References Cited

U.S. PATENT DOCUMENTS

| | | | |
|---|---|---|---|
| 5,324,922 A * | 6/1994 | Roberts | 235/375 |
| 2008/0217392 A1* | 9/2008 | Weiner et al. | 235/375 |
| 2012/0066600 A1* | 3/2012 | Nickel | 715/727 |

* cited by examiner

*Primary Examiner* — Ahshik Kim
(74) *Attorney, Agent, or Firm* — Hawley Troxell Ennis & Hawley LLP; Philip McKay (57) ABSTRACT

Entry data from a data source is obtained, buffered, and analyzed using the one or more barcode scanner data entry differentiation criteria. Based, at least in part, on the analysis of the entry data using the one or more barcode scanner data entry differentiation criteria, a determination is made as to whether the data source is a barcode scanner or a non-barcode scanner data source. If a determination is made that the data source is probably a barcode scanner, then the entry data is categorized as barcode data and processed accordingly.

24 Claims, 4 Drawing Sheets

METHOD AND SYSTEM FOR DISTINGUISHING BARCODE SCANNER DATA ENTRY FROM OTHER FORMS OF DATA ENTRY

SUMMARY

In accordance with one embodiment, a system and method for distinguishing barcode scanner data entry from other forms of data entry makes use of the fact that barcode data received from a barcode scanner can be identified by one or more barcode scanner data entry differentiation criteria including, but not limited to, the fact that once an initial key manipulation event occurs, barcode scanners transfer entry data in streams, or sets, of key manipulation event data that have extremely short time intervals between key manipulation events.

In accordance with one embodiment, the system and method for distinguishing barcode scanner data entry from other forms of data entry obtains and buffers entry data from a data source and then analyzes the entry data using one or more barcode scanner data entry differentiation criteria. In one embodiment, based, at least in part, on the analysis of the entry data using the one or more barcode scanner data entry differentiation criteria, a determination is made as to whether the data source is a barcode scanner or a non-barcode scanner data source. In one embodiment, if a determination is made that the data source is probably a barcode scanner, then the entry data is categorized as barcode data and processed accordingly.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for distinguishing barcode scanner data entry from other forms of data entry includes a process for distinguishing barcode scanner data entry from other forms of data entry implemented by one or more processors associated with one more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein.

In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

Barcodes are optical machine-readable representations of data relating to an object, such as a product or service, or a defined value or rate, to which the barcode representation is attached, or with which it is associated. Herein the term "barcode" includes, but is not limited to, machine-readable representations of data created by varying the widths and spacing of parallel lines; machine-readable representations of data created by various sizes and/or spacing of rectangles, dots, hexagons, and other geometric patterns in two dimensions; and/or any other machine-readable representations of data relating to an object, value, or rate, as discussed herein, and/or as known in the art/available at the time of filing, and/or as developed/made available after the time of filing.

Barcodes are typically scanned and deciphered, or "read", using a barcode scanner. Herein the terms "barcode scanner" and "barcode reader" are used interchangeably and include, but are not limited to, optical scanners for capturing the barcode data and/or any related software systems and/or mechanisms for interpreting or translating the barcode data captured.

In various embodiments, the barcode data relating to an object, such as a product or service, or a value or other abstraction, to which the barcode is attached and/or is associated includes, but is not limited any of the following: data indicating a product, service, and/or model number associated with the product or service; data indicating a part number or service number associated with a product or service; data indicating the name of the provider of a product or service; data indicating the price of a product or service; data indicating key features or uses associated with a product or service; data indicating a location; data indicating a value or rate, such as a tax rate; data indicating a billing or account number; data indicating a shipping or other address; and/or any other barcode data as discussed herein, and/or as known in the art/available at the time of filing, and/or as developed/made available after the time of filing.

One common use of barcodes and barcode scanners is to obtain data regarding an associated object or value, such as a product or service, or data/value, to which the barcode is attached, or which is represented by the barcode. The barcode data is then transferred, typically in the form of key manipulations indicating text or symbols representing the object, to one or more data management systems and/or applications, such as one or more financial management systems.

Herein, a financial management system can be, but is not limited to, any data management system implemented on a computing system and/or accessed through a network that gathers general financial data, and/or financial transactional data, from one or more sources, and/or has the capability to analyze and categorize at least part of the financial data.

Herein, the term "financial management system" can denote, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filing or as developed later.

Currently, many barcode scanners are designed to operate as Human Interface Devices (HIDs) under the human interface device standards set forth in the USB-HID standard specification. HID compliant devices are devices that interact directly with computing systems, typically through USB or wireless communication channels.

The USB-HID standard is used to simplify the process of installing and using the HID devices. Prior to the USB-HID standard, input and output devices usually conformed to strictly defined protocols for the specific device, such as a mouse, a keyboard, a joystick, or a barcode scanner. For example, the standard mouse protocol prior to the USB-HID standard supported relative X and Y axis data and binary input for up to two buttons, with no legacy support. Then all hardware innovations necessitated overloading the use of data in an existing protocol or creation of custom device drivers and evangelization of a new protocol to developers. By contrast, all USB-HID standard devices deliver self-describing packages that may contain any number of data types and formats. Consequently, using USB-HID standards, a single HID driver on the parent computing system parses data and enables dynamic association of entry data/Output with application functionality. This has enabled rapid innovation and development, and prolific diversification of new human interface devices.

However, along with flexibility, power, and convenience, the USB-HID standard as created some unique issues. One of these issues is the fact that, to a computing system and any data management system running on the computing system, a USB-HID standard compliant barcode scanner looks like any other USB-HID standard compliant device. For instance, a USB-HID compliant barcode scanner looks the same to the computing system as a USB-HID standard compliant keyboard. As a result, data received/entered from a USB-HID standard compliant barcode scanner is often not readily distinguishable from data received/entered from a USB-HID standard compliant keyboard. This is because, using the USB-HID standard, data from both data sources is translated into, and transmitted as, streams of key manipulation events such as "key up" and "key down" actions associated with character keys of a keyboard. This issue is particularly problematic for relatively inexpensive barcode scanners which typically do not provide any mechanism for the barcode scanner to identify itself, or its data.

This is a significant problem because many data management systems process barcode data differently than manually entered keyboard data. For instance, since currently there is often no way of distinguishing between barcode data from a USB-HID standard compliant barcode scanner or other data from a USB-HID standard compliant keyboard, when barcode data is being transferred to a data management system from a barcode scanner, the user must first move a cursor to the desired data entry field within an interface screen provided through the data management system. Consequently, a good deal of the potential time savings associated with the use of barcodes and barcode scanners is negated by the user manipulation required to designate the data entry field for each barcode data entry event.

To address this issue, in accordance with one embodiment, the process for distinguishing barcode scanner data entry from other forms of data entry makes use of the fact that data received from a barcode scanner can be uniquely identified by one or more barcode scanner data entry differentiation criteria.

In one embodiment, the process for distinguishing barcode scanner data entry from other forms of data entry obtains, buffers, and analyzes entry data from a data source using the one or more barcode scanner data entry differentiation criteria. In one embodiment, based, at least in part, on the analysis of the entry data using the one or more barcode scanner data entry differentiation criteria, a determination is made as to whether the data source is a barcode scanner or a non-barcode scanner data source. In one embodiment, if a determination is made that the data source is probably a barcode scanner, then the entry data is categorized as barcode data and processed accordingly.

In accordance with one embodiment, data indicating one or more barcode scanner data entry differentiation criteria from one or more barcode scanner data entry differentiation criteria categories is obtained and/or defined.

In various embodiments, one category of the one or more barcode scanner data entry differentiation criteria includes initial key-based barcode scanner data entry differentiation criteria. Initial key-based barcode scanner data entry differentiation criteria use known barcode data initial key manipulation event characteristics to identify non-barcode data entry.

As discussed in more detail below, specific examples of initial key-based barcode scanner data entry differentiation criteria include, but are not limited to, the criterion that if an initial key manipulation event is a "key up" event, i.e., a depressed key is released, the data source is assumed to be a non-barcode scanner data source; the criterion that if the initial key manipulation event indicates a non-valid barcode key character, then the data source is assumed to be a non-barcode scanner data source; the criterion that if the initial key manipulation event indicates a whitespace, then the data source is assumed to be a non-barcode scanner data source; the criterion that if the initial key manipulation event indicates a data source known to be a non-barcode scanner data source, then the data source is assumed to be a non-barcode scanner data source; the criterion that if the initial key manipulation event occurs sooner than a defined time-out period after the last key manipulation event, then the data source is assumed to be a non-barcode scanner data source.

In various embodiments, one category of the one or more barcode scanner data entry differentiation criteria includes timing-based barcode scanner data entry differentiation criteria. Timing-based barcode scanner data entry differentiation criteria use the fact that, once an initial key manipulation event occurs, barcode scanners transfer data in streams, or entry data sets, of key manipulation event data that have extremely short time intervals between key manipulation events. This is in contrast to manually performed key manipulation events received from manual data entry devices such as a keyboard.

As discussed in more detail below, specific examples of timing-based barcode scanner data entry differentiation criteria include, but are not limited to, the criterion that once an initial key manipulation event occurs, if the time between key manipulation events exceeds a defined time-out period, then the data source is assumed to be a non-barcode scanner data source.

In one embodiment, the defined time-out period is determined by the provider of the process for distinguishing barcode scanner data entry from other forms of data entry. As a specific illustrative example, in one embodiment the time-out period is defined as seventy milliseconds.

In some embodiments, if the time-out period is exceeded, then the data source is assumed to be a non-barcode scanner data source. However, it is recognized that if the computing systems system is busy, the barcode scanner entry data might be delayed by several small delays that add up to the time-out period. In addition, due to cut-off values imposed, the time associated with an entry data set may report zero milliseconds have elapsed when, in reality, several milliseconds have gone by. Likewise, the timer with an entry data set may indicate eight milliseconds have elapsed when, in reality, any value between eight and fifteen milliseconds have actually elapsed, etc.

To address this issue, in one embodiment, the timing of each entry data set between timeout events is analyzed and if the number of times a minimum time interval, for example zero milliseconds, was reported exceeds the number of times the value reported is less than a defined cut-off value, for example sixteen milliseconds, then it assumed the entry data set may still represent barcode data and the time-out period is applied a second time.

In one embodiment, if the time-out period is exceeded a second time, then the assumption is made that the data source is probably a non-barcode scanner data source. However, in other embodiments, more than two iterations of the above process are repeated, i.e., more than two time-out periods are applied.

In various embodiments, another category of the one or more barcode scanner data entry differentiation criteria are valid key-based barcode scanner data entry differentiation criteria. Valid key-based barcode scanner data entry differentiation criteria use the fact that only some character keys and key manipulation events are valid barcode character keys and key manipulation events.

As discussed in more detail below, specific examples of valid key-based barcode scanner data entry differentiation criteria include, but are not limited to, the criterion that if a non-valid barcode key manipulation event is identified, such as manipulation of any of the function keys F1 to F12, or a key down manipulation of the FLOCK key, then the data source is assumed to be a non-barcode scanner data source.

In various embodiments, another category of the one or more barcode scanner data entry differentiation criteria are length-based barcode scanner data entry differentiation criteria. Length-based barcode scanner data entry differentiation criteria use the fact that barcodes are typically of defined lengths between a defined minimum and maximum number of characters, as represented by a defined minimum and maximum number of key manipulation events in an entry data set.

In one embodiment, a maximum barcode length and minimum barcode length is established/defined. For instance, as one specific example, in one embodiment, a maximum barcode length is established as thirty bytes and minimum barcode length is established as seven bytes. In addition, it is noted that most USB-HID standard compliant barcode scanners include the carriage return key manipulation (ASCII 13) between barcode codes, or at least allow this requirement to be set. Consequently, if a key manipulation event is not the initial key manipulation event and the key manipulation event is a carriage return key manipulation (ASCII 13), then the preceding entry data set, i.e., the entry data since the last time out interval, or the last carriage return key manipulation (ASCII 13), is assumed to represent an entire barcode.

Therefore, as discussed in more detail below, a specific example of length-based barcode scanner data entry differentiation criteria includes the criterion that if an entry data set between the last time out interval, or the last carriage return key manipulation (ASCII 13), and a current carriage return key manipulation (ASCII 13) indicates an entry data set of a size less than an established minimum barcode value, or greater than an established maximum barcode value, the data source is assumed to be a non-barcode scanner data source.

In various embodiments, the one or more barcode scanner data entry differentiation criteria are based on any combination of the barcode scanner data entry differentiation criteria and barcode scanner data entry differentiation criteria categories discussed above, and/or any other characteristics of barcodes, and/or barcode scanner data entry, as discussed herein, and/or as known in the art at the time of filing, and/or as recognized after the time of filing.

In accordance with one embodiment, entry data from a data source is obtained and buffered before being provided to a computing system and/or a data management system associated with the computing system.

In one embodiment, the entry data from the data source is obtained and buffered by hooking the entry data and temporarily storing the entry data for analysis as it is streamed in. Then, in one embodiment, data indicating each key manipulation event, such as a "key up" and "key down" manipulation of character keys is obtained and analyzed as discussed below.

In one embodiment, one or more features of the computing system's operating system are used to hook and/or buffer the entry data. For instance, as one illustrative example, using any of the WINDOWS™ operating systems, a feature called a "Keyboard Hook" is used that allows defined key manipulation events and/or defined key character input from being delivered to an application. In one embodiment, this "Keyboard Hook" is used to hook and then buffer entry data from the data source.

In various embodiments, other features of the computing system's operating system, and/or any other method, system, process, and/or procedure discussed herein, and/or as known in the art at the time of filing, and/or as developed after the time of filing, is used to hook and/or buffer the entry data.

In one embodiment, the entry data is analyzed to try and determine the data source based on previously received entry data from previous data sources. In one embodiment, identification data associated with the data source, if available, is determined and compared with the identification data associated with known data sources. In one embodiment, if the identification data associated with the data source matches the input identification data associated with a known data source, the data source is categorized accordingly, i.e., it is assumed the data source is the matched known data source. Consequently, if the matched known data source is a barcode scanner, the entry data is assumed to be barcode data.

In one embodiment, the entry data is analyzed to try and determine the data source based on previously received entry data from previous data sources using one or more features of the operating system associated with the computing system. For instance, some operating systems designate multiple data sources as multiple keyboards. Consequently, some operating systems will designate a first data source, such as a keyboard, as "keyboard one" and a second data source, such as a barcode scanner, as "keyboard two". In these instances, if it can be established that "keyboard two" is actually a barcode scanner, then a data source identified as "keyboard two" is assumed to be a barcode scanner.

In one embodiment, the entry data is analyzed to try and determine the data source using one or more operating system features that identify assigned HID devices using other "handles". As a specific example, using any of the WINDOWS™ operating systems, a feature called "Raw Input" is used that provides raw scan codes coming from the HID devices, and the specific keyboard device handle. With this data, a determination can be made that the data source device is different/new and the name of the data source device can be determined under some circumstances.

In one embodiment, if the data source cannot be identified based on previously received entry data from previous data sources, then the data source is categorized as an "unknown" data source.

In one embodiment, the entry data from the unknown data source is then analyzed using one or more of the one or more barcode scanner data entry differentiation criteria.

As a specific illustrative example of one embodiment, the analysis of the entry data from the unknown data source using the one or more barcode scanner data entry differentiation criteria includes identifying an initial key manipulation event and then applying one or more of the initial key-based barcode scanner data entry differentiation criteria.

For instance, in this specific illustrative example, if the identified initial key manipulation event of the entry data from the unknown data source is a "key up" event, i.e., a depressed key is released, the unknown data source is assumed to be a non-barcode scanner data source.

In addition, in this specific illustrative example, if the identified initial key manipulation event of the entry data from the unknown data source indicates a non-valid barcode key character, then the unknown data source is assumed to be a non-barcode scanner data source.

In addition, in this specific illustrative example, if the identified initial key manipulation event of the entry data from the unknown data source indicates a whitespace, then the data source is assumed to be a non-barcode scanner data source.

In addition, in this specific illustrative example, if the identified initial key manipulation event of the entry data from the unknown data source indicates a data source known to be a non-barcode scanner data source, then the data source is assumed to be a non-barcode scanner data source.

In addition, in this specific illustrative example, if the identified initial key manipulation event of the entry data from the unknown data source occurs sooner than a defined time-out period after the last key manipulation event, then the data source is assumed to be a non-barcode scanner data source.

In this specific illustrative example of one embodiment, upon receipt of data indicating the first key manipulation event after the initial key manipulation event, a time-out timer is begun and one or more timing-based barcode scanner data entry differentiation criteria, and/or valid key-based barcode scanner data entry differentiation criteria, and/or length-based barcode scanner data entry differentiation criteria are applied to any, or all, follow-on key manipulation events indicated in the entry data.

For instance, in this specific illustrative example of one embodiment, once the initial key manipulation event occurs, if the time between follow-on key manipulation events in the entry data from the unknown data source exceeds a defined time-out period, then the data source is assumed to be a non-barcode scanner data source.

In addition, in this specific illustrative example of one embodiment, once the initial key manipulation event occurs, if at any point in the entry data from the unknown data source includes a non-valid barcode key entry, such as manipulation of any of the function keys F1 to F12, or a key down manipulation of the FLOCK key, then the data source is assumed to be a non-barcode scanner data source.

In addition, in this specific illustrative example of one embodiment, if an entry data set from the unknown data source that is between the last time out interval, or the last carriage return key manipulation (ASCII 13), and a current carriage return key manipulation (ASCII 13), indicates an entry data set of a size less than an established minimum barcode value, or greater than an established maximum barcode value, then the data source is assumed to be a non-barcode scanner data source.

Although a specific illustrative example of the analysis of the entry data from the unknown data source using the one or more barcode scanner data entry differentiation criteria is discussed above, those of skill in the art will recognize that other embodiments and examples of the analysis of the entry data from the unknown data source using the one or more barcode scanner data entry differentiation criteria are possible that use different barcode scanner data entry differentiation criteria, different combinations of barcode scanner data entry differentiation criteria, and/or apply the barcode scanner data entry differentiation criteria in a different order, or a different number of times/iterations. Consequently, the specific illustrative example of the analysis of the entry data from the unknown data source using the one or more barcode scanner data entry differentiation criteria is not intended to limit the scope of the claims set forth below.

In one embodiment, based, at least in part, on the analysis of the entry data from the unknown data source using the one or more barcode scanner data entry differentiation criteria, a determination is made as to whether the unknown data source is a barcode scanner data source or a non-barcode data source. In one embodiment, if the unknown data source is determined to be a barcode scanner data source, the entry data from the determined barcode scanner data source is categorized as barcode entry data and transferred to the computing system, and/or data management system, to be processed accordingly.

Using the system and method for distinguishing barcode scanner data entry from other forms of data entry discussed herein, the fact that data received from a barcode scanner can be uniquely identified by one or more barcode scanner data entry differentiation criteria is used to distinguish barcode data received from a barcode scanner data source from other entry data from non-barcode scanner data sources. Consequently, using the system and method for distinguishing barcode scanner data entry from other forms of data entry discussed herein, a means of distinguishing between data from a USB-HID standard compliant barcode scanner and from a USB-HID standard compliant keyboard is provided so that the barcode data can be processed correctly without further action.

As a result, in one example, using the system and method for distinguishing barcode scanner data entry from other forms of data entry discussed herein, when barcode data is being transferred to a data management system from a barcode scanner, it is no longer necessary to manipulate a cursor to the desired data entry field within an interface screen provided through the data management system. As a result, the potential time savings associated with the use of barcodes and barcode scanners can be fully realized without being negated by the cursor manipulation currently required to designate the data entry field for each barcode data entry event.

Hardware System Architecture

Figure 1:
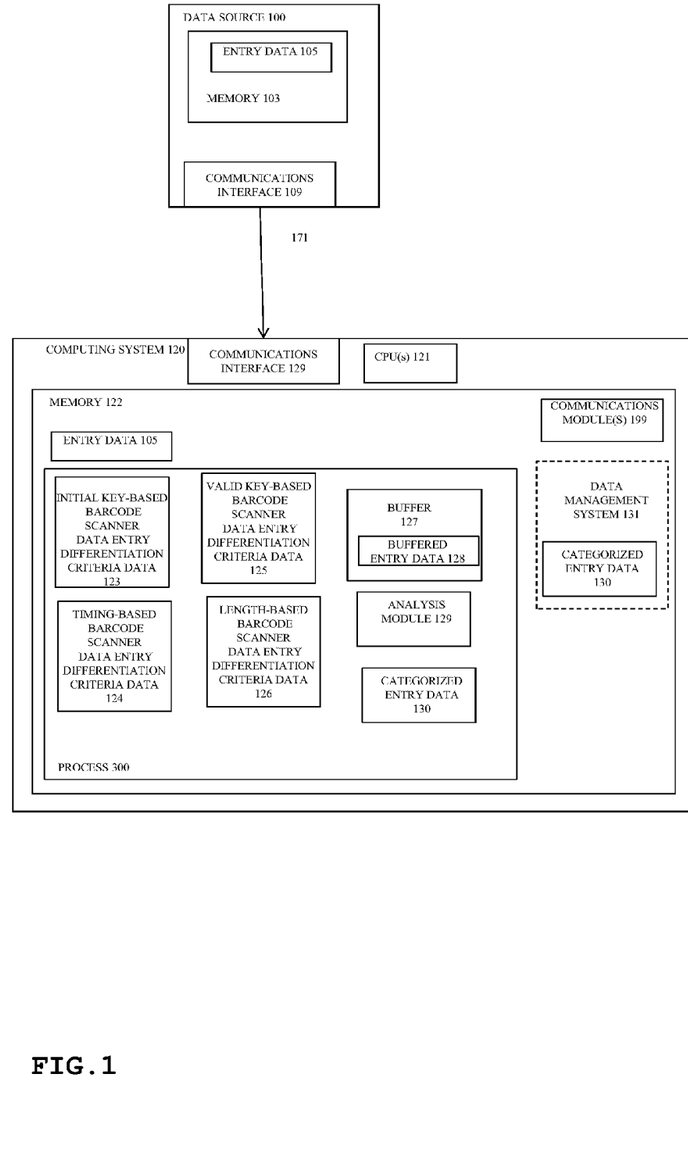
FIG. 1 is a block diagram of an exemplary hardware architecture for implementing one embodiment.

FIG. 1 is a block diagram of an exemplary hardware architecture for implementing one embodiment of a process for distinguishing barcode scanner data entry from other forms of data entry, such as exemplary process 300 (FIG. 3) discussed herein.

FIG. 1 includes data source 100, e.g., a human interface device such as a keyboard or barcode scanner; computing system 120, e.g., a computing system implementing and/or associated with process 300 for distinguishing barcode scanner data entry from other forms of data entry and which receives entry data 105 from data source 100; and communications channel 171.

As seen in FIG. 1, data source 100 includes memory 103 and communication interface 109.

In some embodiments, data source 100 is a barcode scanner. In some embodiments, data source 100 is a barcode scanner designed to operate as a Human Interface Device (HID) under the human interface device standards set forth in the USB-HID standard specification.

In some embodiments, data source 100 is a keyboard. In some embodiments, data source 100 is a keyboard designed to operate as a Human Interface Device (HID) under the human interface device standards set forth in the USB-HID standard specification.

In various embodiments, data source 100 can be any human interface device discussed herein, and/or as known in the art at the time of filing, and/or as developed after the time of filing.

In various embodiments, data source 100 can be any human interface device discussed herein, and/or as known in the art at the time of filing, and/or as developed after the time of filing designed to operate as a Human Interface Device (HID) under the human interface device standards set forth in the USB-HID standard specification.

As noted above, memory 103 includes entry data 105. As discussed in more detail below, in various embodiments, entry data 105 can be either barcode entry data 105 received from a data source 100 that is a barcode scanner or entry data 105 received from a keyboard or other non-barcode scanner data source 100.

While a single data source, data source 100, is shown in FIG. 1, those of skill in the art will readily recognize that data source 100 is representative of any number of data sources. Consequently, in various embodiments, there can be more than the single data source 100 shown in FIG. 1.

As also seen in FIG. 1, computing system 120 typically includes one or more processor/Central Processing Units (CPUs) 121, a memory 122, and a communications interface 129.

Computing system 120 can be any computing system as discussed herein, and/or as known in the art at the time of filing, and/or as developed thereafter, that includes components that can execute all, or part, of process 300 for distinguishing barcode scanner data entry from other forms of data entry in accordance with at least one of the embodiments as described herein.

In one embodiment, memory 122 includes all, or part, of process 300 for distinguishing barcode scanner data entry from other forms of data entry.

In one embodiment, memory 122 includes all, or part, of data management system 131. In various embodiments, data management system 131 is any data management system discussed herein, and/or as known in the art at the time of filing, and/or as developed after the time of filing. As discussed below, in one embodiment, data management system 131 includes categorized entry data 130 as received from process 300 for distinguishing barcode scanner data entry from other forms of data entry.

In one embodiment, memory 122 includes all, or part, of entry data 105 as received from data source 100 via communications interface 109, communications channel 171, and communications interface 129.

In one embodiment, memory 122 includes all, or part, of buffer 127 where entry data 105 is buffered to generate buffered entry data 128 that is processed by process 300 for distinguishing barcode scanner data entry from other forms of data entry. In various embodiments, entry data 105 is directed or hooked to buffer 127 to generate buffered entry data 128 using any of the methods, processes, procedures, or mechanisms discussed herein, and/or as known in the art at the time of filing, and/or as developed after the time of filing.

In one embodiment, memory 122 includes all, or part, of initial key-based barcode scanner data entry differentiation criteria data 123. In various embodiments, the initial key-based barcode scanner data entry differentiation criteria represented by initial key-based barcode scanner data entry differentiation criteria data 123 use known barcode data initial key manipulation event characteristics to identify non-barcode data entry.

Specific examples of the initial key-based barcode scanner data entry differentiation criteria represented by initial key-based barcode scanner data entry differentiation criteria data 123 include, but are not limited to, one of more of, the criterion that if an initial key manipulation event is a "key up" event, i.e., a depressed key is released, the data source is assumed to be a non-barcode scanner data source; the criterion that if the initial key manipulation event indicates a non-valid barcode key character, then the data source is assumed to be a non-barcode scanner data source; the criterion that if the initial key manipulation event indicates a whitespace, then the data source is assumed to be a non-barcode scanner data source; the criterion that if the initial key manipulation event indicates a data source known to be a non-barcode scanner data source, then the data source is assumed to be a non-barcode scanner data source; and/or the criterion that if the initial key manipulation event occurs sooner than a defined time-out period after the last key manipulation event, then the data source is assumed to be a non-barcode scanner data source.

In one embodiment, memory 122 includes all, or part, of timing-based barcode scanner data entry differentiation criteria data 124. In one embodiment, the timing-based barcode scanner data entry differentiation criteria represented by timing-based barcode scanner data entry differentiation criteria data 124 use the fact that, once an initial key manipulation event occurs, barcode scanners transfer data in streams, or entry data sets, of key manipulation event data that have extremely short time intervals between key manipulation events. This is in contrast to manually performed key manipulation events received from manual data entry devices, such as a keyboard.

A specific example of the timing-based barcode scanner data entry differentiation criteria represented by timing-based barcode scanner data entry differentiation criteria data 124 includes, but is not limited to, the criterion that once an initial key manipulation event occurs, if the time between key manipulation events exceeds a defined time-out period, then the data source is assumed to be a non-barcode scanner data source.

In one embodiment, memory 122 includes all, or part, of valid key-based barcode scanner data entry differentiation criteria data 125. In one embodiment, the valid key-based barcode scanner data entry differentiation criteria represented by valid key-based barcode scanner data entry differentiation criteria data 125 use the fact that only some character keys and key manipulation events are valid barcode character keys and key manipulation events.

Specific examples of the valid key-based barcode scanner data entry differentiation criteria represented by valid key-based barcode scanner data entry differentiation criteria data 125 include, but are not limited to, the criterion that if at any point in an entry data set of key manipulation events a non-valid barcode key entry is identified, such as manipulation of any of the function keys F1 to F12, or a key down manipulation of the FLOCK key, the data source is assumed to be a non-barcode scanner data source.

In one embodiment, memory 122 includes all, or part, of length-based barcode scanner data entry differentiation criteria data 126. In one embodiment the length-based barcode scanner data entry differentiation criteria represented by length-based barcode scanner data entry differentiation criteria data 126 use the fact that barcodes are typically of defined lengths between a defined minimum and maximum number of characters, as represented by a defined minimum and maximum number of key manipulation events in an entry data set.

A specific example of the length-based barcode scanner data entry differentiation criteria represented by length-based barcode scanner data entry differentiation criteria data 126 includes the criterion that if an entry data set between the last time out interval, or the last carriage return key manipulation (ASCII 13), and a current carriage return key manipulation (ASCII 13) indicates an entry data set of a size less than an established minimum barcode value, or greater than an established maximum barcode value, the data source is assumed to be a non-barcode scanner data source.

In one embodiment, memory 122 includes all, or part, of analysis module 129. As discussed above, a USB-HID compliant barcode scanner looks the same to computing system 100 as a USB-HID standard compliant keyboard. As a result, entry data 105 received/entered from a USB-HID standard compliant barcode scanner is often not readily distinguishable from entry data 105 received/entered from a USB-HID standard compliant keyboard. This is because, using the USB-HID standard, entry data 105 from both data sources is translated into, and transmitted as, streams of key manipulation events such as "key up" and "key down" actions associated with character keys of a keyboard. This issue is particularly problematic for relatively inexpensive barcode scanners which typically do not provide any mechanism for the barcode scanner to identify itself, or its data.

As also noted above, this is a significant problem since many data management systems, such as data management system 131, process barcode entry data 105 differently than manually entered keyboard entry data 105. For instance, since currently there is often no way of distinguishing between barcode entry data 105 from a USB-HID standard compliant barcode scanner or other entry data 105 from a USB-HID standard compliant keyboard, when barcode entry data 105 is being transferred to data management system 131 from a data source 100 that is a barcode scanner, the user must first move a cursor to the desired data entry field within an interface screen provided through data management system 131. Consequently, a good deal of the potential time savings associated with the use of barcodes and barcode scanners is negated by the user manipulation required to designate the data entry field for each barcode data entry event.

Figure 3:
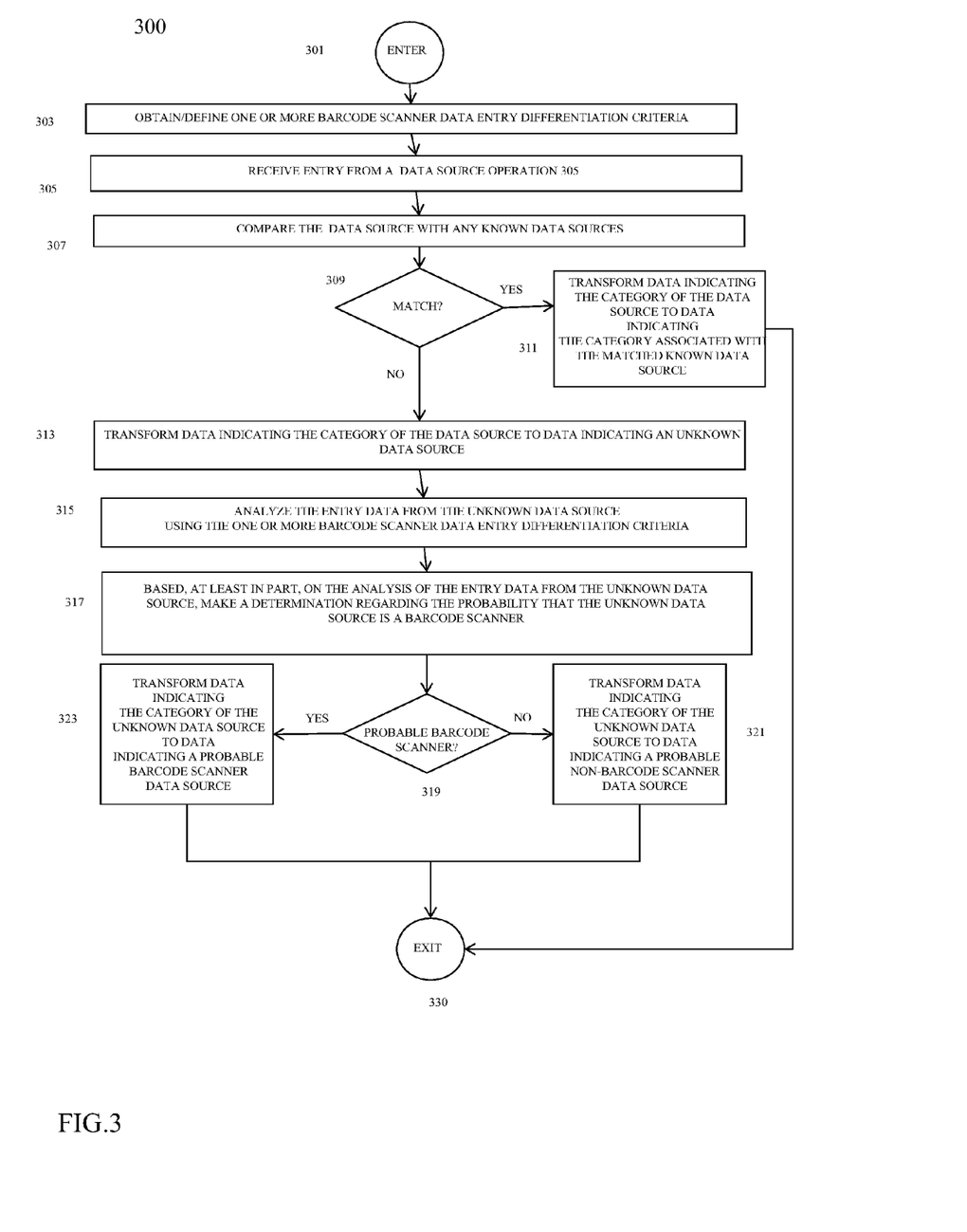
FIG. 3 is a flow chart depicting a process for distinguishing barcode scanner data entry from other forms of data entry in accordance with one embodiment.

To address this issue, in accordance with one embodiment, process 300 for distinguishing barcode scanner data entry from other forms of data entry makes use of the fact that data received from a barcode scanner can be uniquely identified by one or more barcode scanner data entry differentiation criteria.

In one embodiment, process 300 for distinguishing barcode scanner data entry from other forms of data entry obtains entry data 105 data from data source 100 and buffers entry data 105 in buffer 127 to generate buffered entry data 128.

In one embodiment, buffered entry data 128 is accessed by analysis module 129 and analysis module 129 analyzes buffered entry data 128 using the initial key-based barcode scanner data entry differentiation criteria represented by initial key-based barcode scanner data entry differentiation criteria data 123; and/or the timing-based barcode scanner data entry differentiation criteria represented by timing-based barcode scanner data entry differentiation criteria data 124; and/or the valid key-based barcode scanner data entry differentiation criteria represented by valid key-based barcode scanner data entry differentiation criteria data 125; and/or the length-based barcode scanner data entry differentiation criteria represented by length-based barcode scanner data entry differentiation criteria data 126.

In one embodiment, as result of the analysis performed by analysis module 129, a determination is made as to whether data source 100 is a barcode scanner or a non-barcode scanner data source.

In one embodiment, if a determination is made that the data source 100 is probably a barcode scanner, then entry data 105 is transformed into categorized entry data 130 indicating entry data 105 is barcode data. Categorized entry data 130 is then transferred to data management system 131 to be processed accordingly.

In one embodiment, if a determination is made that the data source 100 is probably a non-barcode scanner data source, then entry data 105 is transformed into categorized entry data 130 indicating entry data 105 is non-barcode data. Categorized entry data 130 is then transferred to data management system 131 to be processed accordingly.

Computing system 120 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, a computing system, whether available or known at the time of filing or as later developed.

In one embodiment, communications channel 171 can be, but is not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, data source 100, and/or computing system 120, are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, data source 100, and/or computing system 120, are not relevant.

In various embodiments, the elements shown in FIG. 1 are grouped into one or more processes, or sub-processes, used to implement all, or part of, a process for distinguishing barcode scanner data entry from other forms of data entry, such as exemplary process 300 (FIG. 3) discussed herein.

Figure 2A:
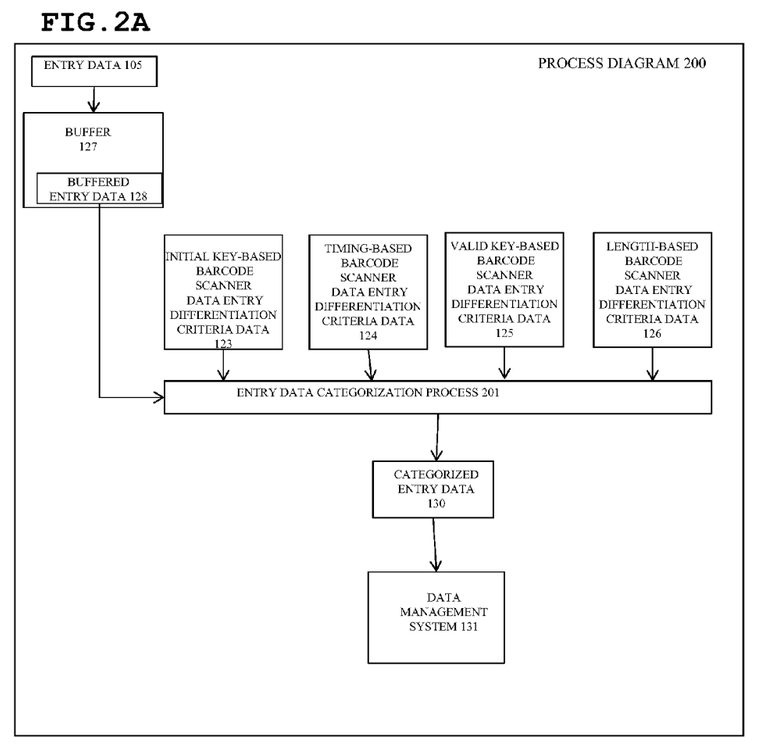
FIG. 2A is a process diagram of part of a process for distinguishing barcode scanner data entry from other forms of data entry in accordance with one embodiment.

FIG. 2A is a process diagram showing one illustrative example of an illustrative process, or sub-process, 201 used to implement part of a process for distinguishing barcode scanner data entry from other forms of data entry, such as exemplary process 300 (FIG. 3) discussed herein.

Figure 2B:
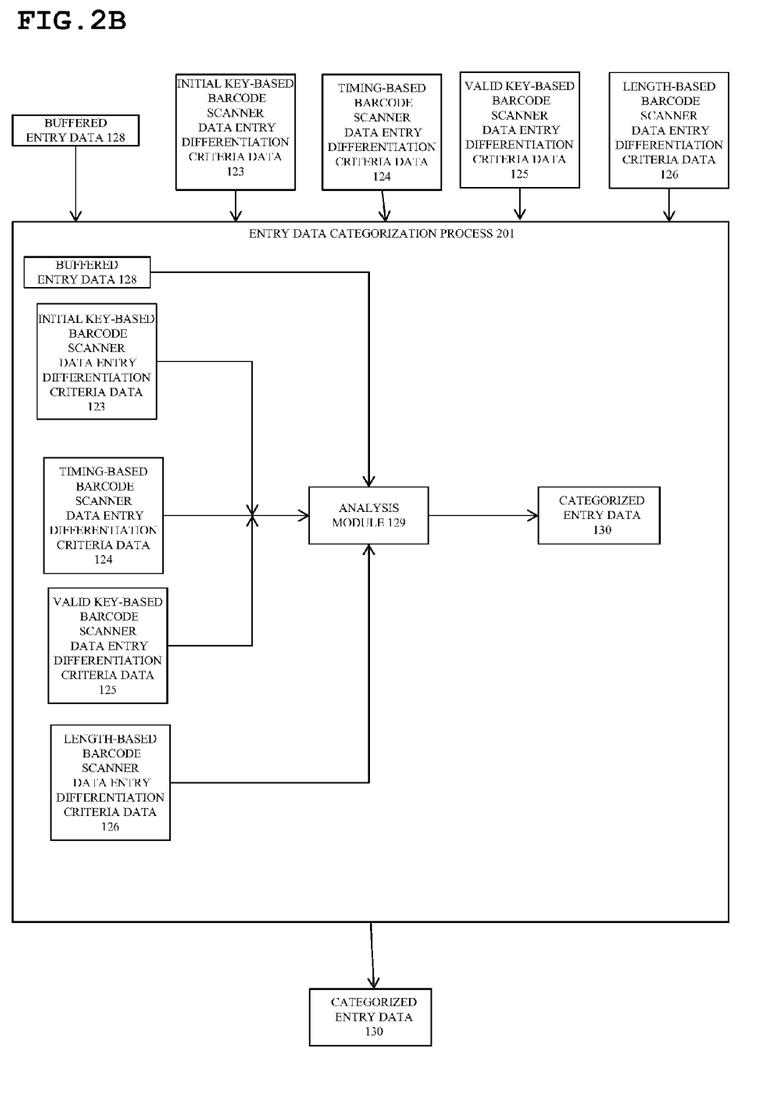
FIG. 2B shows an entry data categorization processes in accordance with one embodiment.

FIG. 2B shows an illustrative example of entry data categorization processes 201 in accordance with one embodiment.

Referring to FIG. 1, FIG. 2A, and FIG. 2B, together, entry data 105 is provided to buffer 127 which temporarily stores entry data 105 to generate buffered entry data 128.

Referring back to FIG. 1, FIG. 2A, and FIG. 2B, together buffered entry data 128 is accessed or provided to entry data categorization process 201 where buffered entry data 128 is processed to generate categorized entry data 130 using initial key-based barcode scanner data entry differentiation criteria data 123, and/or timing-based barcode scanner data entry differentiation criteria data 124, and/or valid key-based barcode scanner data entry differentiation criteria data 125, and/or length-based barcode scanner data entry differentiation criteria data 126. In one embodiment, categorized entry data 130 is then provided to data management system 131 for appropriate processing. FIG. 2B shows entry data categorization process 201 in more detail.

As seen in FIG. 2B, buffered entry data 128, initial key-based barcode scanner data entry differentiation criteria data 123, timing-based barcode scanner data entry differentiation criteria data 124, valid key-based barcode scanner data entry differentiation criteria data 125, and length-based barcode scanner data entry differentiation criteria data 126 are provided as entry data to analysis module 129.

As discussed above, analysis module 129 analyzes buffered entry data 128 using the initial key-based barcode scanner data entry differentiation criteria represented by initial key-based barcode scanner data entry differentiation criteria data 123; and/or the timing-based barcode scanner data entry differentiation criteria represented by timing-based barcode scanner data entry differentiation criteria data 124; and/or the valid key-based barcode scanner data entry differentiation criteria represented by valid key-based barcode scanner data entry differentiation criteria data 125; and/or the length-based barcode scanner data entry differentiation criteria represented by length-based barcode scanner data entry differentiation criteria data 126.

In one embodiment, as result of the analysis performed by analysis module 129, a determination is made as to whether data source 100 (FIG. 1) is a barcode scanner or a non-barcode scanner data source.

In one embodiment, if a determination is made at analysis module 129 that the data source 100 is probably a barcode scanner, then entry data 105 is transformed into categorized entry data 130 indicating the data is barcode data. On the other hand, if a determination is made at analysis module 129 that the data source 100 is probably a non-barcode scanner data source, then entry data 105 is transformed into categorized entry data 130 indicating the data is non-barcode data.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a system and method for distinguishing barcode scanner data entry from other forms of data entry makes use of the fact that barcode data received from a barcode scanner can be identified by one or more barcode scanner data entry differentiation criteria including, but not limited to, the fact that once an initial key manipulation event occurs, barcode scanners transfer entry data in streams, or sets, of key manipulation event data that have extremely short time intervals between key manipulation events.

In accordance with one embodiment, the system and method for distinguishing barcode scanner data entry from other forms of data entry obtains and buffers entry data from a data source and then analyzes the entry data using one or more barcode scanner data entry differentiation criteria. In one embodiment, based, at least in part, on the analysis of the entry data using the one or more barcode scanner data entry differentiation criteria, a determination is made as to whether the data source is a barcode scanner or a non-barcode scanner data source. In one embodiment, if a determination is made that the data source is probably a barcode scanner, then the entry data is categorized as barcode data and processed accordingly.

FIG. 3 is a flow chart depicting a process 300 for distinguishing barcode scanner data entry from other forms of data entry in accordance with one embodiment. Process 300 for distinguishing barcode scanner data entry from other forms of data entry begins at ENTER OPERATION 301 of FIG. 3 and process flow proceeds to OBTAIN/DEFINE ONE OR MORE BARCODE SCANNER DATA ENTRY DIFFERENTIATION CRITERIA OPERATION 303.

In one embodiment, at OBTAIN/DEFINE ONE OR MORE BARCODE SCANNER DATA ENTRY DIFFERENTIATION CRITERIA OPERATION 303 data indicating one or more barcode scanner data entry differentiation criteria from one or more barcode scanner data entry differentiation criteria categories is obtained and/or defined.

In one embodiment, one category of the one or more barcode scanner data entry differentiation criteria of OBTAIN/DEFINE ONE OR MORE BARCODE SCANNER DATA ENTRY DIFFERENTIATION CRITERIA OPERATION 303 includes initial key-based barcode scanner data entry differentiation criteria.

In one embodiment, the initial key-based barcode scanner data entry differentiation criteria of OBTAIN/DEFINE ONE OR MORE BARCODE SCANNER DATA ENTRY DIFFERENTIATION CRITERIA OPERATION 303 use known barcode data initial key manipulation event characteristics to identify non-barcode data entry.

Specific examples of initial key-based barcode scanner data entry differentiation criteria include, but are not limited to, one of more of, the criterion that if an initial key manipulation event is a "key up" event, i.e., a depressed key is released, the data source is assumed to be a non-barcode scanner data source; the criterion that if the initial key manipulation event indicates a non-valid barcode key character, then the data source is assumed to be a non-barcode scanner data source; the criterion that if the initial key manipulation event indicates a whitespace, then the data source is assumed to be a non-barcode scanner data source; the criterion that if the initial key manipulation event indicates a data source known to be a non-barcode scanner data source, then the data source is assumed to be a non-barcode scanner data source; and/or the criterion that if the initial key manipulation event occurs sooner than a defined time-out period after the last key manipulation event, then the data source is assumed to be a non-barcode scanner data source.

In one embodiment, one category of the one or more barcode scanner data entry differentiation criteria of OBTAIN/DEFINE ONE OR MORE BARCODE SCANNER DATA ENTRY DIFFERENTIATION CRITERIA OPERATION 303 includes timing-based barcode scanner data entry differentiation criteria.

In one embodiment, the timing-based barcode scanner data entry differentiation criteria of OBTAIN/DEFINE ONE OR MORE BARCODE SCANNER DATA ENTRY DIFFERENTIATION CRITERIA OPERATION 303 use the fact that, once an initial key manipulation event occurs, barcode scanners transfer data in streams, or entry data sets, of key manipulation event data that have extremely short time intervals between key manipulation events. This is in contrast to manually performed key manipulation events received from manual data entry devices, such as a keyboard.

A specific example of a timing-based barcode scanner data entry differentiation criterion includes, but is not limited to, the criterion that once an initial key manipulation event occurs, if the time between key manipulation events exceeds a defined time-out period, then the data source is assumed to be a non-barcode scanner data source.

In one embodiment, the defined time-out period of OBTAIN/DEFINE ONE OR MORE BARCODE SCANNER DATA ENTRY DIFFERENTIATION CRITERIA OPERATION 303 is determined by the provider of process 300 for distinguishing barcode scanner data entry from other forms of data entry. As a specific illustrative example, in one embodiment the time-out period is defined as seventy milliseconds.

In some embodiments, if the time-out period of OBTAIN/DEFINE ONE OR MORE BARCODE SCANNER DATA ENTRY DIFFERENTIATION CRITERIA OPERATION 303 is exceeded, then the data source is assumed to be a non-barcode scanner data source. However, it is recognized that if the computing system is busy, the barcode scanner entry data might be delayed by several small delays that add up to more than the time-out period.

In addition, due to cut-off values imposed, the time associated with an entry data set may report zero milliseconds have elapsed when, in reality, several milliseconds have gone by. Likewise, the timer associated with an entry data set may indicate eight milliseconds have elapsed when, in reality, any value between eight and fifteen milliseconds have actually elapsed, etc.

To address this issue, in one embodiment, the timing of each entry data set between timeout events is analyzed and if the number of times a minimum time interval, for example zero milliseconds, was reported exceeds the number of times the value reported is less than a defined cut-off value, for example sixteen milliseconds, then it assumed the entry data set may still represent barcode data and the time-out period is applied a second time.

In one embodiment, if the time-out period is exceeded a second time, then the assumption is made that the data source is probably a non-barcode scanner data source. However, in other embodiments, more than two iterations of the above process are repeated, i.e., more than two time-out periods are applied.

In one embodiment, one category of the one or more barcode scanner data entry differentiation criteria of OBTAIN/DEFINE ONE OR MORE BARCODE SCANNER DATA ENTRY DIFFERENTIATION CRITERIA OPERATION 303 are valid key-based barcode scanner data entry differentiation criteria.

In one embodiment, the valid key-based barcode scanner data entry differentiation criteria of OBTAIN/DEFINE ONE OR MORE BARCODE SCANNER DATA ENTRY DIFFERENTIATION CRITERIA OPERATION 303 use the fact that only some character keys and key manipulation events are valid barcode character keys and key manipulation events.

Specific examples of valid key-based barcode scanner data entry differentiation criteria include, but are not limited to, the criterion that if at any point in an entry data set of key manipulation events a non-valid barcode key entry is identified, such as manipulation of any of the function keys F1 to F12, or a key down manipulation of the FLOCK key, then the data source is assumed to be a non-barcode scanner data source.

In one embodiment, one category of the one or more barcode scanner data entry differentiation criteria of OBTAIN/DEFINE ONE OR MORE BARCODE SCANNER DATA ENTRY DIFFERENTIATION CRITERIA OPERATION 303 are length-based barcode scanner data entry differentiation criteria.

In one embodiment the length-based barcode scanner data entry differentiation criteria of OBTAIN/DEFINE ONE OR MORE BARCODE SCANNER DATA ENTRY DIFFERENTIATION CRITERIA OPERATION 303 use the fact that barcodes are typically of defined lengths between a defined minimum and maximum number of characters, as represented by a defined minimum and maximum number of key manipulation events in an entry data set.

In one embodiment, a maximum barcode length and minimum barcode length is established/defined. For instance, as one specific example, in one embodiment, a maximum barcode length is established as thirty bytes and minimum barcode length is established as seven bytes.

In addition, most USB-HID standard compliant barcode scanners include the carriage return key manipulation (ASCII 13) between barcode codes, or at least allow this requirement to be set. Consequently, if a key manipulation event is not the initial key manipulation event, and the key manipulation event is a carriage return key manipulation (ASCII 13), then the preceding entry data set, i.e., the portion of the entry data since the last time out interval, or since the last carriage return key manipulation (ASCII 13), is assumed to represent an entire barcode.

Therefore, a specific example of length-based barcode scanner data entry differentiation criteria includes the criterion that if an entry data set between the last time out interval, or the last carriage return key manipulation (ASCII 13), and a current carriage return key manipulation (ASCII 13) indicates an entry data set of a size less than an established minimum barcode value, or greater than an established maximum barcode value, the data source is assumed to be a non-barcode scanner data source.

In various embodiments, the one or more barcode scanner data entry differentiation criteria are any combination of the barcode scanner data entry differentiation criteria, and/or barcode scanner data entry differentiation criteria categories, discussed above, and/or any other characteristics of barcodes, and/or barcode scanner data entry, as discussed herein, and/or as known in the art at the time of filing, and/or as recognized after the time of filing.

In one embodiment, once data indicating one or more barcode scanner data entry differentiation criteria from one or more barcode scanner data entry differentiation criteria categories is obtained and/or defined at OBTAIN/DEFINE ONE OR MORE BARCODE SCANNER DATA ENTRY DIFFERENTIATION CRITERIA OPERATION 303, the data representing the one or more barcode scanner data entry differentiation criteria from one or more barcode scanner data entry differentiation criteria categories is stored in one or more databases.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, once data indicating one or more barcode scanner data entry differentiation criteria from one or more barcode scanner data entry differentiation criteria categories is obtained and/or defined at OBTAIN/DEFINE ONE OR MORE BARCODE SCANNER DATA ENTRY DIFFERENTIATION CRITERIA OPERATION 303, process flow proceeds to RECEIVE ENTRY DATA FROM A DATA SOURCE OPERATION 305.

In one embodiment, at RECEIVE ENTRY DATA FROM A DATA SOURCE OPERATION 305, entry data from a data source is obtained and buffered before being provided to a computing system, and/or a data management system associated with the computing system.

In one embodiment, at RECEIVE ENTRY DATA FROM A DATA SOURCE OPERATION 305 the entry data from a data source is obtained and buffered by hooking the entry data and temporarily storing the entry data for analysis as it is streamed in. Then, in one embodiment, data indicating each key manipulation event, such as a "key up" and "key down" manipulation of character keys is obtained and analyzed as discussed below.

In one embodiment, at RECEIVE ENTRY DATA FROM A DATA SOURCE OPERATION 305 one or more features of the computing system's operating system are used to hook and/or buffer the entry data.

For instance, as one illustrative example, using any of the WINDOWS™ operating systems, a feature called a "Keyboard Hook" is used that allows defined key manipulation events and/or defined key character input from being delivered to an application. In one embodiment, this "Keyboard Hook" is used at RECEIVE ENTRY DATA FROM A DATA SOURCE OPERATION 305 to hook and then buffer entry data from the data source.

In various embodiments, at RECEIVE ENTRY DATA FROM A DATA SOURCE OPERATION 305 other features of the computing system's operating system, and/or any other method, system, process, and/or procedure discussed herein, and/or as known in the art at the time of filing, and/or as developed after the time of filing, are used to hook and/or buffer the entry data.

In one embodiment, once entry data from a data source is obtained and buffered before being provided to the computing systems, and/or a data management system associated with the computing system, at RECEIVE ENTRY DATA FROM A DATA SOURCE OPERATION 305, process flow proceeds to COMPARE THE DATA SOURCE WITH ANY KNOWN DATA SOURCES OPERATION 307.

In one embodiment, at COMPARE THE DATA SOURCE WITH ANY KNOWN DATA SOURCES OPERATION 307, the entry data of RECEIVE ENTRY DATA FROM A DATA SOURCE OPERATION 305 is analyzed to try and determine the data source based on previously received entry data from previously used data sources.

In one embodiment, at COMPARE THE DATA SOURCE WITH ANY KNOWN DATA SOURCES OPERATION 307, the entry data of RECEIVE ENTRY DATA FROM A DATA SOURCE OPERATION 305 is analyzed to try and determine the data source based on previously received entry data from previously used data sources under the direction of one or more processors, such as CPU 121 of FIG. 1, associated with one or more computing systems, such as computing system 120 of FIG. 1.

Returning to FIG. 3, in one embodiment, at COMPARE THE DATA SOURCE WITH ANY KNOWN DATA SOURCES OPERATION 307, identification data associated with the data source of RECEIVE ENTRY DATA FROM A DATA SOURCE OPERATION 305, if available, is determined and compared with the identification data associated with known data sources.

In one embodiment, at COMPARE THE DATA SOURCE WITH ANY KNOWN DATA SOURCES OPERATION 307, the entry data of RECEIVE ENTRY DATA FROM A DATA SOURCE OPERATION 305 is analyzed to try and determine the data source based on previously received entry data from previous data sources using one or more features of the operating system associated with the computing system.

For instance, some operating systems designate multiple data sources as multiple keyboards. Consequently, some operating systems will designate a first data source, such as a keyboard, as "keyboard one" and a second data source, such as a barcode scanner, as "keyboard two". In these instances, if it can be established that "keyboard two" is actually a barcode scanner, then at COMPARE THE DATA SOURCE WITH ANY KNOWN DATA SOURCES OPERATION 307 a data source identified as "keyboard two" is assumed to be a barcode scanner.

In one embodiment, at COMPARE THE DATA SOURCE WITH ANY KNOWN DATA SOURCES OPERATION 307, the entry data of RECEIVE ENTRY DATA FROM A DATA SOURCE OPERATION 305 is analyzed to try and determine the data source using one or more operating system features that identify assigned HID devices using other "handles".

As a specific example, using any of the WINDOWS™ operating systems, a feature called "Raw Input" is used that provides raw scan codes coming from the HID devices, and the specific keyboard device handle. With this data, a determination can be made at COMPARE THE DATA SOURCE WITH ANY KNOWN DATA SOURCES OPERATION 307 that the data source is different/new and the name of the data source device can be determined under some circumstances.

In one embodiment, if at COMPARE THE DATA SOURCE WITH ANY KNOWN DATA SOURCES OPERATION 307, the identification data associated with the data source of RECEIVE ENTRY DATA FROM A DATA SOURCE OPERATION 305 matches the input identification data associated with a known data source, the data source is categorized accordingly, i.e., it is assumed the data source is the matched known data source. Consequently, if the matched known data source is a barcode scanner, at MATCH? OPERATION 309 a "yes" result is obtained and the entry data is assumed to be barcode data. Process flow then proceeds to TRANSFORM DATA INDICATING THE CATEGORY OF THE DATA SOURCE TO DATA INDICATING THE CATEGORY ASSOCIATED WITH THE MATCHED KNOWN DATA SOURCE OPERATION 311.

In one embodiment, once the data indicating a category for the data source of RECEIVE ENTRY DATA FROM A DATA SOURCE OPERATION 305 is transformed to data indicating the category of the matched known data source at TRANSFORM DATA INDICATING THE CATEGORY OF THE DATA SOURCE TO DATA INDICATING THE CATEGORY ASSOCIATED WITH THE MATCHED KNOWN DATA SOURCE OPERATION 311, process flow proceeds to EXIT OPERATION 330.

On the other hand, if, at COMPARE THE DATA SOURCE WITH ANY KNOWN DATA SOURCES OPERATION 307, the identification data associated with the data source of RECEIVE ENTRY DATA FROM A DATA SOURCE OPERATION 305 fails to match the input identification data associated with any known data source, then at MATCH? OPERATION 309 a "no" result is obtained and process flow proceeds to TRANSFORM DATA INDICATING THE CATEGORY OF THE DATA SOURCE TO DATA INDICATING AN UNKNOWN DATA SOURCE OPERATION 313.

In one embodiment, at TRANSFORM DATA INDICATING THE CATEGORY OF THE DATA SOURCE TO DATA INDICATING AN UNKNOWN DATA SOURCE OPERATION 313, data indicating a category for the data source of RECEIVE ENTRY DATA FROM A DATA SOURCE OPERATION 305 is transformed to data indicating a category for the data source of "unknown" and the entry data is subjected to further processing.

In one embodiment, at TRANSFORM DATA INDICATING THE CATEGORY OF THE DATA SOURCE TO DATA INDICATING AN UNKNOWN DATA SOURCE OPERATION 313, data indicating a category for the data source of RECEIVE ENTRY DATA FROM A DATA SOURCE OPERATION 305 is transformed to data indicating a category for the data source of unknown under the direction of one or more processors, such as CPU 121 of FIG. 1, associated with one or more computing systems, such as computing system 120 of FIG. 1.

Returning to FIG. 3, in one embodiment, once data indicating a category for the data source of RECEIVE ENTRY DATA FROM A DATA SOURCE OPERATION 305 is transformed to data indicating a category for the data source of unknown at TRANSFORM DATA INDICATING THE CATEGORY OF THE DATA SOURCE TO DATA INDICATING AN UNKNOWN DATA SOURCE OPERATION 313, process flow proceeds to ANALYZE THE ENTRY DATA FROM THE UNKNOWN DATA SOURCE USING THE ONE OR MORE BARCODE SCANNER DATA ENTRY DIFFERENTIATION CRITERIA OPERATION 315.

In one embodiment, at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the entry data of RECEIVE ENTRY DATA FROM A DATA SOURCE OPERATION 305 from the unknown data source of TRANSFORM DATA INDICATING THE CATEGORY OF THE DATA SOURCE TO DATA INDICATING AN UNKNOWN DATA SOURCE OPERATION 313 is analyzed using the one or more of the one or more barcode scanner data entry differentiation criteria of OBTAIN/DEFINE ONE OR MORE BARCODE SCANNER DATA ENTRY DIFFERENTIATION CRITERIA OPERATION 303.

As a specific illustrative example of one embodiment, the analysis of the entry data from the unknown data source using the one or more barcode scanner data entry differentiation criteria of ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 includes identifying an initial key manipulation event and then applying one or more of the initial key-based barcode scanner data entry differentiation criteria of OBTAIN/DEFINE ONE OR MORE BARCODE SCANNER DATA ENTRY DIFFERENTIATION CRITERIA OPERATION 303.

For instance, in this specific illustrative example, if at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the identified initial key manipulation event of the entry data from the unknown data source is a "key up" event, i.e., a depressed key is released, the unknown data source is assumed to be a non-barcode scanner data source.

In addition, in this specific illustrative example, if at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the identified initial key manipulation event of the entry data from the unknown data source indicates a non-valid barcode key character, then the unknown data source is assumed to be a non-barcode scanner data source.

In addition, in this specific illustrative example, if at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the identified initial key manipulation event of the entry data from the unknown data source indicates a whitespace, then the data source is assumed to be a non-barcode scanner data source.

In addition, in this specific illustrative example, if at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the identified initial key manipulation event of the entry data from the unknown data source indicates a data source known to be a non-barcode scanner data source, then the data source is assumed to be a non-barcode scanner data source.

In addition, in this specific illustrative example, if at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the identified initial key manipulation event of the entry data from the unknown data source occurs sooner than a defined time-out period after the last key manipulation event, then the data source is assumed to be a non-barcode scanner data source.

In this specific illustrative example of one embodiment, at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 upon receipt of data indicating the first key manipulation event after the initial key manipulation event, a time-out timer is begun and one or more timing-based barcode scanner data entry differentiation criteria, and/or valid key-based barcode scanner data entry differentiation criteria, and/or length-based barcode scanner data entry differentiation criteria, of OBTAIN/DEFINE ONE OR MORE BARCODE SCANNER DATA ENTRY DIFFERENTIATION CRITERIA OPERATION 303 are applied to any, or all, follow-on key manipulation events indicated in the entry data.

For instance, in this specific illustrative example of one embodiment, once the initial key manipulation event occurs, if at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the time between follow-on key manipulation events in an entry data set from the unknown data source exceeds a defined time-out period, then the data source is assumed to be a non-barcode scanner data source.

In addition, in this specific illustrative example of one embodiment, once the initial key manipulation event occurs, if at any point in the entry data set from the unknown data source a non-valid barcode key entry is identified, such as manipulation of any of the function keys F1 to F12, or a key down manipulation of the FLOCK key, then at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 the data source is assumed to be a non-barcode scanner data source.

In addition, in this specific illustrative example of one embodiment, if at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 entry data from the unknown data source that is between the last time out interval, or the last carriage return key manipulation (ASCII 13), and a current carriage return key manipulation (ASCII 13), indicates an entry data set of a size less than an established minimum barcode value, or greater than an established maximum barcode value, then the data source is assumed to be a non-barcode scanner data source.

Although a specific illustrative example of the analysis of the entry data from the unknown data source using the one or more barcode scanner data entry differentiation criteria of ANALYZE THE ENTRY DATA FROM THE UNKNOWN DATA SOURCE USING THE ONE OR MORE BARCODE SCANNER DATA ENTRY DIFFERENTIATION CRITERIA OPERATION 315 is discussed above, those of skill in the art will recognize that other embodiments and examples of the analysis of the entry data from the unknown data source using the one or more barcode scanner data entry differentiation criteria are possible that use different barcode scanner data entry differentiation criteria, different combinations of barcode scanner data entry differentiation criteria, and/or apply the barcode scanner data entry differentiation criteria in a different order, or a different number of times. Consequently, the specific illustrative example of the analysis of the entry data from the unknown data source using the one or more barcode scanner data entry differentiation criteria above is not intended to limit the scope of the claims set forth below.

In one embodiment, once the entry data of RECEIVE ENTRY DATA FROM A DATA SOURCE OPERATION 305 from the unknown data source of TRANSFORM DATA INDICATING THE CATEGORY OF THE DATA SOURCE TO DATA INDICATING AN UNKNOWN DATA SOURCE OPERATION 313 is analyzed using the one or more of the one or more barcode scanner data entry differentiation criteria of OBTAIN/DEFINE ONE OR MORE BARCODE SCANNER DATA ENTRY DIFFERENTIATION CRITERIA OPERATION 303 at ANALYZE THE ENTRY DATA FROM THE UNKNOWN DATA SOURCE USING THE ONE OR MORE BARCODE SCANNER DATA ENTRY DIFFERENTIATION CRITERIA OPERATION 315, process flow proceeds to BASED, AT LEAST IN PART, ON THE ANALYSIS OF THE ENTRY DATA FROM THE UNKNOWN DATA SOURCE, MAKE A DETERMINATION REGARDING THE PROBABILITY THAT THE UNKNOWN DATA SOURCE IS A BARCODE SCANNER OPERATION 317.

In one embodiment, at BASED, AT LEAST IN PART, ON THE ANALYSIS OF THE ENTRY DATA FROM THE UNKNOWN DATA SOURCE, MAKE A DETERMINATION REGARDING THE PROBABILITY THAT THE UNKNOWN DATA SOURCE IS A BARCODE SCANNER OPERATION 317 based, at least in part, on the analysis of the entry data from the unknown data source using the one or more barcode scanner data entry differentiation criteria of ANALYZE THE ENTRY DATA FROM THE UNKNOWN DATA SOURCE USING THE ONE OR MORE BARCODE SCANNER DATA ENTRY DIFFERENTIATION CRITERIA OPERATION 315, a determination is made as to whether the unknown data source is a barcode scanner data source or a non-barcode data source.

In one embodiment, at BASED, AT LEAST IN PART, ON THE ANALYSIS OF THE ENTRY DATA FROM THE UNKNOWN DATA SOURCE, MAKE A DETERMINATION REGARDING THE PROBABILITY THAT THE UNKNOWN DATA SOURCE IS A BARCODE SCANNER OPERATION 317 based, at least in part, on the analysis of the entry data from the unknown data source using the one or more barcode scanner data entry differentiation criteria of ANALYZE THE ENTRY DATA FROM THE UNKNOWN DATA SOURCE USING THE ONE OR MORE BARCODE SCANNER DATA ENTRY DIFFERENTIATION CRITERIA OPERATION 315, a determination is made as to whether the unknown data source is a barcode scanner data source or a non-barcode data source under the direction of one or more processors, such as CPU 121 of FIG. 1, associated with one or more computing systems, such as computing system 120 of FIG. 1.

Returning to FIG. 3, in one embodiment, if at BASED, AT LEAST IN PART, ON THE ANALYSIS OF THE ENTRY DATA FROM THE UNKNOWN DATA SOURCE, MAKE A DETERMINATION REGARDING THE PROBABILITY THAT THE UNKNOWN DATA SOURCE IS A BARCODE SCANNER OPERATION 317 the unknown data source is determined not to be a barcode scanner data source, then a "no" result is obtained at PROBABLE BARCODE SCANNER? OPERATION 319 and process flow proceeds to TRANSFORM DATA INDICATING THE CATEGORY OF THE UNKNOWN DATA SOURCE TO DATA INDICATING A PROBABLE NON-BARCODE SCANNER DATA SOURCE OPERATION 321.

In one embodiment, at TRANSFORM DATA INDICATING THE CATEGORY OF THE UNKNOWN DATA SOURCE TO DATA INDICATING A PROBABLE NON-BARCODE SCANNER DATA SOURCE OPERATION 321 data indicating the category of the entry data as unknown of TRANSFORM DATA INDICATING THE CATEGORY OF THE DATA SOURCE TO DATA INDICATING AN UNKNOWN DATA SOURCE OPERATION 313 is transformed into data indicating a category of probable non-barcode scanner data source and the entry data of RECEIVE ENTRY DATA FROM A DATA SOURCE OPERATION 305 is categorized as non-barcode entry data and transferred to the computing system, and/or data management system, to be processed accordingly.

On the other hand, in one embodiment, if at BASED, AT LEAST IN PART, ON THE ANALYSIS OF THE ENTRY DATA FROM THE UNKNOWN DATA SOURCE, MAKE A DETERMINATION REGARDING THE PROBABILITY THAT THE UNKNOWN DATA SOURCE IS A BARCODE SCANNER OPERATION 317 the unknown data source is determined to be a barcode scanner data source, then a "yes" result is obtained at PROBABLE BARCODE SCANNER? OPERATION 319 and process flow proceeds to TRANSFORM DATA INDICATING THE CATEGORY OF THE UNKNOWN DATA SOURCE TO DATA INDICATING A PROBABLE BARCODE SCANNER DATA SOURCE OPERATION 323.

In one embodiment, at TRANSFORM DATA INDICATING THE CATEGORY OF THE UNKNOWN DATA SOURCE TO DATA INDICATING A PROBABLE BARCODE SCANNER DATA SOURCE OPERATION 323 data indicating the category of the entry data as unknown of TRANSFORM DATA INDICATING THE CATEGORY OF THE DATA SOURCE TO DATA INDICATING AN UNKNOWN DATA SOURCE OPERATION 313 is transformed into data indicating a category of probable barcode scanner data source and the entry data of RECEIVE ENTRY DATA FROM A DATA SOURCE OPERATION 305 is categorized as barcode entry data and transferred to the computing system, and/or data management system, to be processed accordingly.

In one embodiment, from either TRANSFORM DATA INDICATING THE CATEGORY OF THE UNKNOWN DATA SOURCE TO DATA INDICATING A PROBABLE NON-BARCODE SCANNER DATA SOURCE OPERATION 321 or TRANSFORM DATA INDICATING THE CATEGORY OF THE UNKNOWN DATA SOURCE TO DATA INDICATING A PROBABLE BARCODE SCANNER DATA SOURCE OPERATION 323, process flows proceeds to EXIT OPERATION 330.

In one embodiment, at EXIT OPERATION 330, process 300 for distinguishing barcode scanner data entry from other forms of data entry is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for distinguishing barcode scanner data entry from other forms of data entry discussed above, the fact that data received from a barcode scanner can be uniquely identified by one or more barcode scanner data entry differentiation criteria is used to distinguish barcode data received from a barcode scanner data source from other entry data from non-barcode scanner data sources. Consequently, using process 300 for distinguishing barcode scanner data entry from other forms of data entry, a means of distinguishing between data from a USB-HID standard compliant barcode scanner or a USB-HID standard compliant keyboard is provided so that the barcode data can be processed correctly without further action.

As a result, in one example, using process 300 for distinguishing barcode scanner data entry from other forms of data entry, when barcode data is being transferred to a data management system from a barcode scanner, it is no longer necessary to manipulate a cursor to the desired data entry field within an interface screen provided through the data management system. As a result, the time savings associated with the use of barcodes and barcode scanners can be fully realized and not negated by the cursor manipulation currently required to designate the data entry field for each barcode data entry event.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for distinguishing barcode scanner data entry from other forms of data entry comprising the following, which when executed individually or collectively by any set of one or more processors perform a process including:
   obtaining data representing one or more barcode scanner data entry differentiation criteria;
   receiving entry data from a data source;
   analyzing the entry data using at least one of the one or more barcode scanner data entry differentiation criteria, wherein at least one of the one or more barcode scanner data entry differentiation criteria is a valid key-based barcode scanner data entry differentiation criterion; and
   based, at least in part, on the analysis of the entry data using at least one of the one or more barcode scanner data entry differentiation criteria, categorizing the entry data as either barcode entry data or non-barcode entry data.

2. The computing system implemented method for distinguishing barcode scanner data entry from other forms of data entry of claim 1 wherein at least one of the one or more barcode scanner data entry differentiation criteria is an initial key-based barcode scanner data entry differentiation criterion including a key manipulation event criteria.

3. The computing system implemented method for distinguishing barcode scanner data entry from other forms of data entry of claim 1 wherein at least one of the one or more barcode scanner data entry differentiation criteria is an initial key-based barcode scanner data entry differentiation criterion selected from the group consisting of:
   the criterion that if an initial key manipulation event indicated in the entry data is a "key up" manipulation event, the entry data is determined to be non-barcode entry data;
   the criterion that if an initial key manipulation event indicated in the entry data is a non-valid barcode key manipulation event, the entry data is determined to be non-barcode entry data;
   the criterion that if an initial key manipulation event indicated in the entry data is a whitespace key manipulation event, the entry data is determined to be non-barcode entry data;
   the criterion that if the initial key manipulation event indicated in the entry data is associated with a data entry source known to be a non-barcode data source the entry data is determined to be non-barcode entry data;
   the criterion that if an initial key manipulation event indicated in the entry data occurs sooner than a defined time-out period after a last key manipulation event indicated in the entry data, the entry data is determined to be non-barcode entry data;

or any combination thereof.

4. The computing system implemented method for distinguishing barcode scanner data entry from other forms of data entry of claim 1 wherein at least one of the one or more barcode scanner data entry differentiation criteria is a timing-based barcode scanner data entry differentiation criterion involving a length of time between a first key manipulation event and a second key manipulation event.

5. The computing system implemented method for distinguishing barcode scanner data entry from other forms of data entry of claim 4 wherein the timing-based barcode scanner data entry differentiation criterion is applied such that if the time between two consecutive key manipulation events following an initial key manipulation event indicated in the entry data exceeds a defined time-out period, the entry data is determined to be non-barcode entry data.

6. The computing system implemented method for distinguishing barcode scanner data entry from other forms of data entry of claim 1 wherein at least one of the one or more barcode scanner data entry differentiation criteria is a length-based barcode scanner data entry differentiation criterion involving the number of key manipulations in the entry data.

7. A computing system implemented method for distinguishing barcode scanner data entry from other forms of data entry comprising the following, which when executed individually or collectively by any set of one or more processors perform a process including:
   obtaining data representing one or more barcode scanner data entry differentiation criteria;
   receiving entry data from a data source;
   buffering the entry data;
   analyzing the buffered entry data using at least one of the one or more barcode scanner data entry differentiation criteria, wherein at least one of the one or more barcode scanner data entry differentiation criteria is a valid key-based barcode scanner data entry differentiation criterion;
   based, at least in part, on the analysis of the buffered entry data using at least one of the one or more barcode scanner data entry differentiation criteria, making a determination that the data source is a barcode scanner;
   categorizing the entry data as barcode entry data; and
   transferring the categorized barcode entry data to at least one data management system for processing as barcode data.

8. The computing system implemented method for distinguishing barcode scanner data entry from other forms of data entry of claim 7 wherein at least one of the one or more barcode scanner data entry differentiation criteria is an initial key-based barcode scanner data entry differentiation criterion including a key manipulation event criteria.

9. The computing system implemented method for distinguishing barcode scanner data entry from other forms of data entry of claim 7 wherein at least one of the one or more barcode scanner data entry differentiation criteria is an initial key-based barcode scanner data entry differentiation criterion selected from the group consisting of:
   the criterion that if an initial key manipulation event indicated in the entry data is a "key up" manipulation event, the data source is determined to be a non-barcode scanner data source;
   the criterion that if an initial key manipulation event indicated in the entry data is a non-valid barcode key manipulation event, the data source is determined to be a non-barcode scanner data source;
   the criterion that if an initial key manipulation event indicated in the entry data is a whitespace key manipulation event, the data source is determined to be a non-barcode scanner data source;
   the criterion that if the initial key manipulation event indicated in the entry data is associated with a data entry source known to be a non-barcode data source, the data source is determined to be a non-barcode scanner data source;
   the criterion that if an initial key manipulation event indicated in the entry data occurs sooner than a defined time-out period after a last key manipulation event indicated in the entry data, the data source is determined to be a non-barcode scanner data source;
   or any combination thereof.

10. The computing system implemented method for distinguishing barcode scanner data entry from other forms of data entry of claim 7 wherein at least one of the one or more barcode scanner data entry differentiation criteria is a timing-based barcode scanner data entry differentiation criterion involving a length of time between a first key manipulation event and a second key manipulation event.

11. The computing system implemented method for distinguishing barcode scanner data entry from other forms of data entry of claim 10 wherein the timing-based barcode scanner data entry differentiation criterion is applied such that if the time between two consecutive key manipulation events following an initial key manipulation event indicated in the entry data exceeds a defined time-out period, the data source is determined to be non-barcode scanner data source.

12. The computing system implemented method for distinguishing barcode scanner data entry from other forms of data entry of claim 7 wherein at least one of the one or more barcode scanner data entry differentiation criteria is a length-based barcode scanner data entry differentiation criterion involving the number of key manipulations in the entry data.

13. A computer program product for distinguishing barcode scanner data entry from other forms of data entry comprising:
   a nontransitory computer readable medium;
   and computer program code, encoded on the computer readable medium, comprising computer readable instructions which, when executed via any set of one or more processors, perform the following:
   obtaining data representing one or more barcode scanner data entry differentiation criteria;
   receiving entry data from a data source;
   analyzing the entry data using at least one of the one or more barcode scanner data entry differentiation criteria, wherein at least one of the one or more barcode scanner data entry differentiation criteria is a valid key-based barcode scanner data entry differentiation criterion; and
   based, at least in part, on the analysis of the entry data using at least one of the one or more barcode scanner data entry differentiation criteria, categorizing the entry data as either barcode entry data or non-barcode entry data.

14. The computer program product for distinguishing barcode scanner data entry from other forms of data of claim 13 wherein at least one of the one or more barcode scanner data entry differentiation criteria is an initial key-based barcode scanner data entry differentiation criterion including a key manipulation event criteria.

15. The computer program product for distinguishing barcode scanner data entry from other forms of data of claim 13 wherein at least one of the one or more barcode scanner data entry differentiation criteria is an initial key-based barcode scanner data entry differentiation criterion selected from the group consisting of:

the criterion that if an initial key manipulation event indicated in the entry data is a "key up" manipulation event, the entry data is determined to be non-barcode entry data;

the criterion that if an initial key manipulation event indicated in the entry data is a non-valid barcode key manipulation event, the entry data is determined to be non-barcode entry data;

the criterion that if an initial key manipulation event indicated in the entry data is a whitespace key manipulation event, the entry data is determined to be non-barcode entry data;

the criterion that if the initial key manipulation event indicated in the entry data is associated with a data entry source known to be a non-barcode data source, the entry data is determined to be non-barcode entry data;

the criterion that if an initial key manipulation event indicated in the entry data occurs sooner than a defined time-out period after a last key manipulation event indicated in the entry data, the entry data is determined to be non-barcode entry data;

or any combination thereof.

16. The computer program product for distinguishing barcode scanner data entry from other forms of data of claim 13 wherein at least one of the one or more barcode scanner data entry differentiation criteria is a timing-based barcode scanner data entry differentiation criterion involving a length of time between a first key manipulation event and a second key manipulation event.

17. The computer program product for distinguishing barcode scanner data entry from other forms of data of claim 16 wherein the timing-based barcode scanner data entry differentiation criterion is applied such that if the time between two consecutive key manipulation events following an initial key manipulation event indicated in the entry data exceeds a defined time-out period, the entry data is determined to be non-barcode entry data.

18. The computer program product for distinguishing barcode scanner data entry from other forms of data of claim 13 wherein at least one of the one or more barcode scanner data entry differentiation criteria is a length-based barcode scanner data entry differentiation criterion involving the number of key manipulations in the entry data.

19. A system for distinguishing barcode scanner data entry from other forms of data entry comprising:

at least one processor; and at least one memory coupled to the at least one processor, the at least one memory having stored therein instructions which when executed by any set of the one or more processors, perform a process for distinguishing barcode scanner data entry from other forms of data entry, the process for distinguishing barcode scanner data entry from other forms of data entry including:

obtaining data representing one or more barcode scanner data entry differentiation criteria;

receiving entry data from a data source;

analyzing the entry data using at least one of the one or more barcode scanner data entry differentiation criteria, wherein at least one of the one or more barcode scanner data entry differentiation criteria is a valid key-based barcode scanner data entry differentiation criterion; and based, at least in part, on the analysis of the entry data using at least one of the one or more barcode scanner data entry differentiation criteria, categorizing the entry data as either barcode entry data or non-barcode entry data.

20. The system for distinguishing barcode scanner data entry from other forms of data entry of claim 19 wherein at least one of the one or more barcode scanner data entry differentiation criteria is an initial key-based barcode scanner data entry differentiation criterion including a key manipulation event criteria.

21. The system for distinguishing barcode scanner data entry from other forms of data entry of claim 19 wherein at least one of the one or more barcode scanner data entry differentiation criteria is an initial key-based barcode scanner data entry differentiation criterion selected from the group consisting of:

the criterion that if an initial key manipulation event indicated in the entry data is a "key up" manipulation event, the entry data is determined to be non-barcode entry data;

the criterion that if an initial key manipulation event indicated in the entry data is a non-valid barcode key manipulation event, the entry data is determined to be non-barcode entry data;

the criterion that if an initial key manipulation event indicated in the entry data is a whitespace key manipulation event, the entry data is determined to be non-barcode entry data;

the criterion that if the initial key manipulation event indicated in the entry data is associated with a data entry source known to be a non-barcode data source, the entry data is determined to be non-barcode entry data;

the criterion that if an initial key manipulation event indicated in the entry data occurs sooner than a defined time-out period after a last key manipulation event indicated in the entry data, the entry data is determined to be non-barcode entry data;

or any combination thereof.

22. The system for distinguishing barcode scanner data entry from other forms of data entry of claim 19 wherein at least one of the one or more barcode scanner data entry differentiation criteria is a timing-based barcode scanner data entry differentiation criterion involving a length of time between a first key manipulation event and a second key manipulation event.

23. The system for distinguishing barcode scanner data entry from other forms of data entry of claim 22 wherein the timing-based barcode scanner data entry differentiation criterion is applied such that if the time between two consecutive key manipulation events following an initial key manipulation event indicated in the entry data exceeds a defined time-out period, the entry data is determined to be non-barcode entry data.

24. The system for distinguishing barcode scanner data entry from other forms of data entry of claim 19 wherein at least one of the one or more barcode scanner data entry differentiation criteria is a length-based barcode scanner data entry differentiation criterion involving the number of key manipulations in the entry data.

* * * * *